June 13, 1944.  H. H. SCHMIDT  2,351,070
APPARATUS FOR MAKING MOLASSES FEEDS AND SIMILAR MATERIALS
Filed Aug. 8, 1941  3 Sheets-Sheet 1
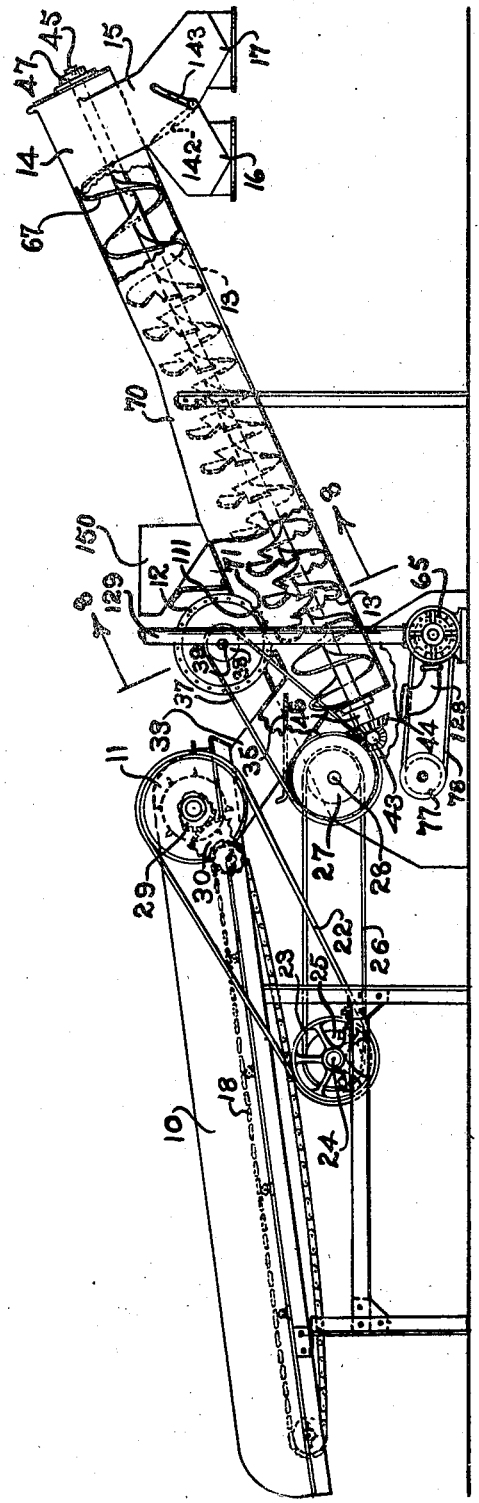
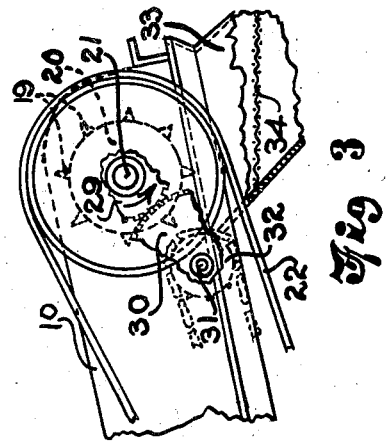
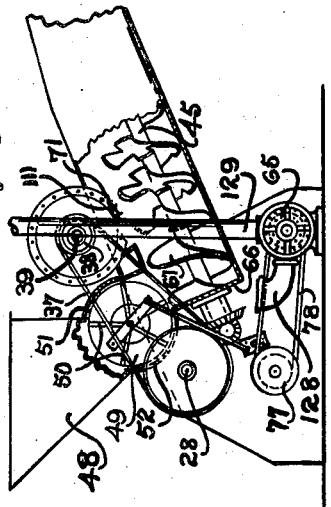
INVENTOR.
HERMANN HENRY SCHMIDT
BY Alfred R. Fuchs
ATTORNEYS.

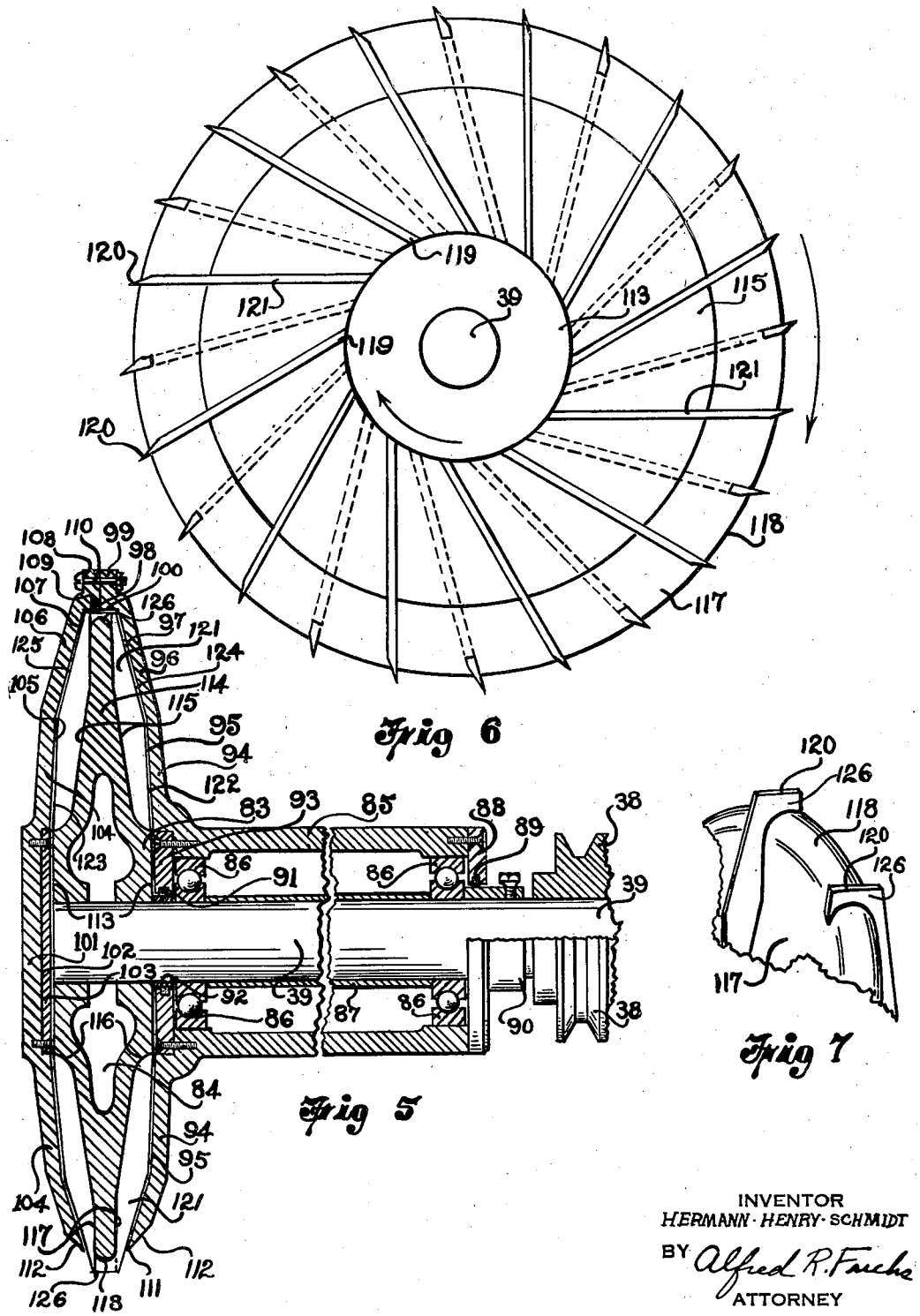

June 13, 1944.  H. H. SCHMIDT  2,351,070
APPARATUS FOR MAKING MOLASSES FEEDS AND SIMILAR MATERIALS
Filed Aug. 8, 1941   3 Sheets-Sheet 3
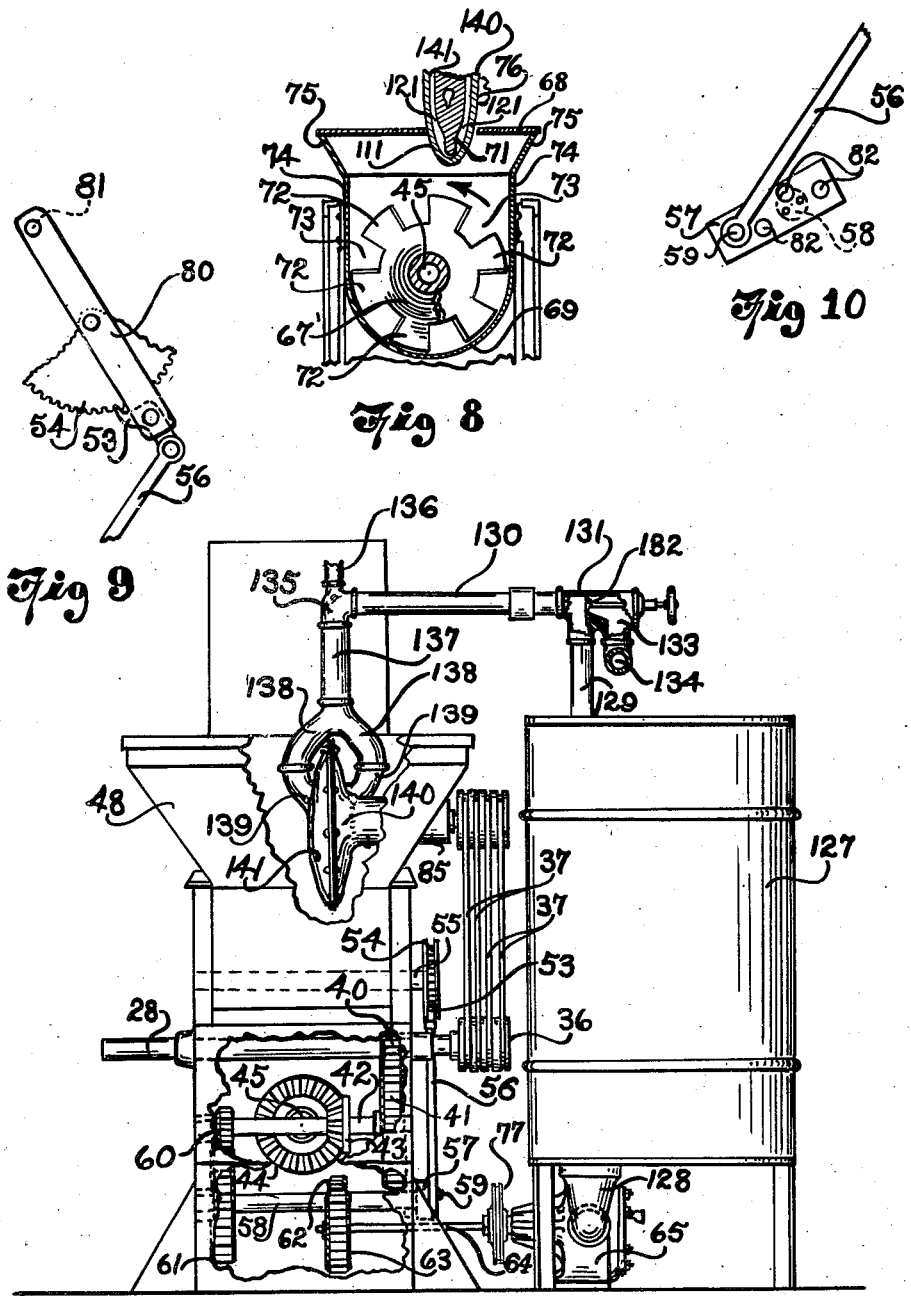
INVENTOR
*HERMANN·HENRY·SCHMIDT*
BY *Alfred R. Fuchs*
ATTORNEY Patented June 13, 1944

2,351,070

UNITED STATES PATENT OFFICE 2,351,070

APPARATUS FOR MAKING MOLASSES FEEDS AND SIMILAR MATERIALS

Hermann Henry Schmidt, Hanover, Kans., assignor to The Universal Royalty and Development Company, St. Joseph, Mo., a corporation of Missouri Application August 8, 1941, Serial No. 405,962

16 Claims. (Cl. 99—235)

My invention relates to an apparatus for making molasses feeds, or similar materials, and constitutes an improvement over my Patent No. 2,241,425, patented May 13, 1941, on Apparatus for vaporizing and spraying thick liquids.

It is a purpose of my invention to provide an apparatus of the above mentioned character, which comprises means for conveying solid material, such as cut dry feed material, in a predetermined path, which leads through a zone into which a finely divided liquid, which may be of a viscous character, such as molasses, is sprayed, so as to engage upon and impregnate the dry or solid material with the liquid, said conveying means comprising means for agitating the material while the liquid is being sprayed thereon and while the material is being advanced along the path that it takes through the apparatus. The apparatus is particularly adapted for spraying a thick viscous liquid on a dry material and thoroughly mixing the dry material and the liquid, so as to coat and impregnate all particles of the dry material with said liquid, and while said apparatus is particularly adapted for use in manufacturing what is commonly known as a molasses feed, comprising cut or chopped solid feed material impregnated with molasses sprayed thereon, obviously the apparatus could be used for impregnating or coating other dry materials with a liquid. Furthermore, while a liquid is referred to herein, it is to be understood that the liquid may be composed of a plurality of liquids, that have been blended together, or a liquid that might carry finely powdered solid material therein, blended therewith.

More particularly my invention comprises an apparatus of the above mentioned character, in which the liquid is finely divided and made into a substantially vaporous spray, by means of rotating means that whips the liquid about in a casing, so as to break up the same to produce the vaporous material above referred to, and means for changing the viscosity of the material and spraying the same which is of the general type shown in the above referred to patent.

It is one of the purposes of my invention to provide a new and improved means for centrifugally whirling and spraying a viscous liquid, or any other liquid, that is to be finely divided and sprayed onto another material.

It is a further purpose of my invention to provide an apparatus of the above mentioned character, comprising means for centrifugally whirling and discharging under centrifugal force a material of a liquid, or semi-liquid, character, in a mist-like or vaporous state, on a material made up of pieces of solid material, such as a feed material, in which the spraying means discharges said vaporized, or finely divided, liquid onto the material that is to be impregnated therewith longitudinally of the path of the conveying means, and to provide means for exposing all portions of the material carried along by the conveying means to the action of the liquid so sprayed, which comprises agitating members forming part of the conveying means that operate to agitate or continuously turn over the material to be impregnated by the liquid, so as to expose all portions thereof to the spray, said agitating means operating transversely of the length of the conveying means to agitate said cut feed material transversely of the direction in which the liquid is discharged by the centrifugal means finely dividing the same.

It is a further purpose of my invention to provide means for controlling the rate of feed of the liquid, or similar material, that is sprayed onto the feed or similar solid material, and to provide means for controlling the rate of feed of said material, so that the two feeding means can be relatively adjusted so as to apply to the feed or similar solid material any desired quantity of the liquid, or similar material, per unit of volume of said solid material.

While my apparatus is adapted for manufacturing a molasses feed material, or a similar food composition, made up of a dry or finely divided solid ingredient and a liquid ingredient sprayed thereon, in which the solid feed material, which has been previously reduced to a small size by cutting or chopping operations, is fed from a hopper to the conveying means above referred to, it is a particular purpose of my invention to provide an apparatus in which feed materials, such as cornstalks, for example, are fed into the apparatus and suitably cut or broken up to permit the use thereof in the molasses feed, or similar product, and after being so reduced in size or cut up, are fed to the conveying means automatically, and then carried by said feeding means into the spraying zone, where the solid feed material is agitated while the liquid with which it is impregnated is being sprayed thereon, after which said material is carried to a point of discharge where the same is ready for sacking, or placing in any suitable containers, without the necessity of heating the same or in any other manner putting the same through a drying operation. In order to accomplish this purpose of the invention, the operation of the cutting, feeding, conveying and spraying means is properly synchronized, so as to get the proper feed of the ingredients of the feed product, or other food product, that may be produced in my apparatus, to get the desired nutritive value thereof per unit of volume.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in side elevation, partly broken away, of my improved molasses feed producing apparatus, the molasses container being omitted to more clearly show the construction of the apparatus.

Fig. 2 is a fragmentary view, similar to Fig. 1, of a modification thereof.

Fig. 3 is an enlarged fragmentary view, partly in elevation and partly in section, of the cutting apparatus for the solid feed material and adjacent parts.

Fig. 4 is an end view of the form of the apparatus shown in Fig. 2, on an enlarged scale, and including the molasses container.

Fig. 5 is a transverse sectional view through the centrifugal vaporizing and spraying device, partly broken away and partly in elevation, on an enlarged scale.

Fig. 6 is a view in side elevation of the rotor shown in Fig. 5.

Fig. 7 is a fragmentary perspective view of the rotor shown in Fig. 5.

Fig. 8 is a section taken substantially on the line 8—8 of Fig. 1.

Fig. 9 is a fragmentary detail view of the ratchet end of the feeding mechanism shown in Fig. 2, and Fig. 10 is a fragmentary detail view of the crank end thereof.

Referring in detail to the drawings, in Fig. 1 is shown a molasses feed producing apparatus comprising a feed table 10, upon which the feed material, such as cornstalks, for example, may be placed, a feed material cutting apparatus, indicated generally at 11, a liquid vaporizing and spraying device, indicated generally at 12, and a conveying and agitating means, indicated generally at 13, which is provided with a housing 14, that is provided with a discharge conduit 15 having two discharge outlets 16 and 17, on which a sack, or similar container, may be placed for discharging the material thereinto after being made by said apparatus.

The table-like member 10 may be provided with any suitable means for conveying and carrying the solid feed material, or similar solid material, such for example, as cornstalks, into the cutting apparatus, said conveyor being indicated generally at 18 in Fig. 1, and being of any desired character that will carry forward and force the stalks, or similar pieces of feed material, into engagement with teeth 19, or similar cutter members, on a rotary cutter 20 of the cutting apparatus, the number of toothed members 20 provided and the spacing thereof in an axial direction being dependent on the fineness to which it is desired to cut the material that is fed into the cutter device 11. Said members 20 are mounted on the shaft 21 to rotate therewith, and said shaft 21 is rotated in the direction indicated by the arrow in Fig. 3, by means of a pulley, over which the belt 22 operates, said belt 22 operating over a pulley 23 fixed on a shaft 24, which has the pulley 25 fixed thereon to rotate therewith, over which a belt 26 operates, said belt 26 operating over a pulley 27 fixed on the main drive shaft 28 of the machine, so that the rotation of the cutter members is synchronized with the rotation of the main drive shaft 27, which operates the conveying means and spraying means to be described below.

The operation of the conveyor 18 is also synchronized with the operation of the conveying means 13 and the spraying means 12, and of the cutting means 11, inasmuch as the conveyor is driven by means of the gear 29 meshing with a gear 30, mounted on a shaft 31, which is provided with a sprocket 32 that drives the conveyor 18. While a certain form of table and conveyor are shown for receiving the corn stalks, or similar feed material, and for carrying it to the cutter 11, the particular length and style of such solid feed receiving table and the particular type of conveying means is of no particular importance to the invention, as any suitable means for carrying the feed material forwardly into engagement with the cutter members of the cutting mechanism 11, may be provided. It is, of course, necessary that the cutter rotate at a much more rapid rate than the conveyor 18 travels. The cutter device carries the cut off pieces of solid feed material downwardly as the same rotates in the direction of the arrow indicated in Fig. 3, to discharge the same into the upper end of a chute 33.

Mounted in the chute 33 is, preferably, a screen 34 of desired mesh to prevent particles, or pieces, of the feed material, of too large size, from passing into the conveying apparatus where the liquid ingredient is applied to said material, and in the form of the invention shown in Fig. 1 an adjustable feed controlling member 35 is provided in the chute above the discharge end thereof, the same being shown as being made in the form of a slide that can be opened the full width, or any fraction of the width, of the chute, as may be desired. Said adjustable feed controlling member 35 is, preferably, located below the screen 34, as will be obvious from Figs. 1 and 3.

Any suitable framework and suitable housing means for the various mechanical parts may be provided. The liquid spraying and dry feed conveying apparatus is driven from the main drive shaft 28 in a manner to be described below, in both forms of the apparatus shown, and any suitable means for driving the main drive shaft 28 may be provided, such as a motor, or any other form of driving means, either directly connected with said shaft 28 or through a belt and pulley, or other similar drive, of a well known character. In the form of the invention shown in Fig. 1 it is immaterial whether the drive is from such a source of power driving the shaft 28 or the shaft 21, whichever may be the most convenient, as the two shafts are driven at a predetermined definite speed relative to each other. Said main drive shaft 28 is provided with a pulley 36 keyed to one end thereof, which is grooved to receive a plurality of V-belts 37, said V-belts 37 operating over the pulley 38 fixed to the rotor shaft 39 (see Figs. 1, 2 and 4). A pinion 40 is also fixed on the shaft 28, which meshes with a gear 41 provided on a countershaft 42, which is provided with a bevel gear 43 meshing with the bevel gear 44, which is fixed on the end of the hollow conveyor shaft 45, which shaft is mounted in a bearing 46 near the lower end thereof, and in a bearing 47 in the upper end of the housing 14. The conveyor mounted on the shaft 45 is thus driven at a predetermined definite rate relative to the rate of rotation of the rotor on the rotor shaft 39, and at a definite rate of rotation relative to the rotation of the cutter members 20.

In the form of the invention shown in Fig. 2, instead of providing an adjustable feed controlling member 35, a rotary feed controlling member is provided near the bottom end of the hopper 48, into which the already chopped, or finely divided, feed material is dumped in any desired manner. Said rotary feeding member is provided with side plates 49, between which the blades, or plates, 50 are mounted, that both agitate the material in the hopper 48 and feed it at a predetermined rate onto the conveyor member provided in the housing 14 at its lower end. The rotary feed controlling member thus provided is enclosed within a housing, except where the same empties into the conveyor and where the same receives the cut feed material from the hopper, side walls and curved bottom and top walls 51 and 52 being provided for enclosing the feeding device to direct the material from the hopper onto the conveyor. The rotary feeding member is driven in a step by step manner, by means of a pawl 53 cooperating with a gear 54, mounted on the shaft 55, on which said rotary feeding member is fixed, the movements of the pawl being determined by means of an arm 80 carrying said pawl, pivoted on the shaft 55 and provided with a counter weight 81. Said arm 80 is pivoted to a connecting rod 56, which is pivoted on a crank 57 on the shaft 58, the rod 56 being adjustable on the crank 57 by movement of the pivot member 59 into any of the openings 82 of the crank, to vary the throw of the same and thus the amount of each feeding movement of the pawl produced by the rotation of the crank 57. The shaft 58 is driven from the shaft 42 at a greatly reduced speed, by means of the pinion 60 on the shaft 42, which meshes with the gear 61 on the shaft 58.

The shaft 58 is also provided with a pinion 62 fixed thereto, that meshes with the gear 63 on a shaft 64, which is provided with a pulley 77, over which a belt 78 operates. The belt 78 drives a pulley on the shaft of a pump 65 of any desired character, for pumping the liquid to the vaporizing and spraying device in a manner that will be described below.

The conveyor housing 14 is provided with a lower inclined end wall 66, to which the rotary feeding member having the blades or plates 50, leads, or to which the chute 33 leads, as the case may be, in either case depositing the cut feed material on the spiral or screw-like flange portion 67 provided on the conveyor shaft 45 and forming a part of the screw conveyor means for the cut feed material. Said conveyor means rotates in the direction indicated by the arrow in Fig. 8, and due to such rotation the conveyor will carry the cut solid feed material upwardly toward the upper end of the inclined housing 14, said housing being provided with a suitable top wall 68, which is substantially flat, but which inclines toward the curved bottom wall 69 of the conveyor housing at 70, to reduce the cross section of the housing to substantially the size of the screw, or spiral conveyor, mounted within the same. The cross section of the conveyor housing is thus enlarged where the spraying zone exists, as the housing of the vaporizing and spraying apparatus is mounted upon the housing 68 and projects therethrough at 71, as will be obvious from Figs. 1 and 2.

Only the upper and the lower end portions of the screw, or spiral conveyor, have the spiral flanges 67 provided thereon solely for conveying purposes. The portion of the conveyor between the ends thereof, and particularly within the zone in which the liquid is sprayed onto the material that is being carried upwardly in the housing 14 of the conveyor, is provided with means for thoroughly agitating the solid ingredient of the feed material while the spraying action is taking place and subsequently thereto, to thoroughly aerate the same and cause the liquid that is sprayed thereon to dry and put the material in proper condition for discharge into containers at the discharge orifices 16 and 17. The means for providing the agitation of the preferably dry feed material above referred to, comprises a plurality of blades 72, shown more in detail in Fig. 8, which are arranged spirally along the conveyor, by cutting out portions 73 of the spiral flange 67 to leave an uninterrupted central portion 67' of said flange and an interrupted peripheral portion thereof, providing a series of spirally arranged agitator blades 72 operating substantially transversely of the direction in which the entire mass of material is being carried lengthwise of the conveyor housing 14 by the flanges 67, 67', and blades 72. It will be noted upon reference to Fig. 8 that the side walls 74 of the housing at the enlarged portion thereof extend substantially vertically tangentially of the curved wall portion 69 and that the said side walls flare at 75 toward the top wall 68, so as to provide a mixing chamber, within the conveyor housing 14, through which the housing, or casing, 76 of the spraying means extends.

Mounted on the shaft 39 is a rotor that has the central hub portion 83, which is provided with an annular opening 84 therein to reduce the weight thereof, said rotor being fixed on the shaft 39. A casing is provided which comprises a tubular portion 85 that surrounds the shaft 39 and which is provided with ball bearings 86 for the shaft 39, a spacing sleeve 87 being provided between the ball races of said ball bearings. The tubular casing portion 85 is closed by means of a plate 88, which has a packing element 89 thereon that engages the collar 90 on the shaft 39 to prevent leakage of liquid from the casing. The tubular portion 85 of the casing is also sealed from the annular casing portion, to be described below, by an annular packing member 91, which is mounted between the collar 92 on the shaft and an annular plate 93 fixed to the casing adjacent one of the ball races 86, as will be evident from Fig. 5.

The annular portion of the casing comprises a wall portion extending outwardly from the casing portion 85 at one end thereof having a conical portion 94 providing an annular wall portion 95 on the inner face thereof that is substantially conical and inclines in a direction outwardly from the axial center of the casing toward the central plane of the annular main body portion of the casing. Said outwardly extending wall portion also comprises a conical wall portion 96 that inclines still more toward the central plane of the annular body portion to provide a conical wall portion 97 that extends at an angle to the conical wall portion 95. At the outer annular edge portion of said annular wall is an annular flange 98 extending substantially parallel to the axis of the shaft 39 and an annular flange 99 extending substantially perpendicularly to the axis of the shaft 39, said annular flange 98 being provided with a cylindrical inner wall portion 100 extending parallel to the axis of the shaft 39.

The annular enlargement or main body portion of the casing is completed by means of a cover member, which has a central portion 101, which is provided with flat inner and outer faces, the flat inner face 102 thereof having a bearing plate 103 secured thereto, which has a flat face that extends parallel to the flat face of the annular member 93 secured on the opposite side of the casing to the plate 103. The cover plate 101 has a conical wall portion 104 that extends outwardly from the central portion 101 and inclines toward the conical wall portion 94 at the same angle to the central plane of the annular casing as said wall portion 94, to thus provide an inner conical wall 105, which inclines toward the inner conical wall 95. The cover member of the housing also has a more sharply inwardly inclined conical wall portion 106, which is inclined at the same angle as the wall portion 96, and which has a conical inner face 107 corresponding to the conical inner face 97 of the wall 96, said conical inner faces extending at the same angle to the central plane of the annular body portion and to the walls 95 and 105, so that a symmetrical annular chamber is formed within the annular body portion. The cover plate is further provided with an annular flange 108 that extends substantially perpendicularly to the axis of the shaft 39, and with an annular cut away portion or recess 109, in which the end portion of the flange 98 seats when the flanges 99 and 108 are secured together by means of the securing elements 110. The bottom portion of the housing thus formed is cut away at an angle along the bottom side thereof, as indicated at 111 in Figs. 1, 2, 6 and 8, the edges of the annular portions 96 and 106 being beveled, as indicated at 112, to provide somewhat thinned edges of the casing adjacent the opening provided due to the cut away portion 111.

The rotor is provided with flat parallel side walls 113 on opposite faces of the hub lying closely adjacent the flat inner faces of the plate-like member 103 and the annular member 93. Said rotor is provided with a tapering portion lying outwardly from the hub, indicated generally by the numeral 114, having opposite conical faces 115 that extend from the concavely curved portions 116 joining the same with the hub portion of the rotor to parallel wall portions 117 that lie outwardly from the wall portions 115 to provide an outer annular portion of uniform thickness on the rotor, terminating in the curved peripheral edge portion 118. Said curved peripheral edge portion 118 is spaced from the annular wall 100 at the periphery of the annular casing and projects through the opening at the cut away portion 111 slightly.

The rotor is provided with blades, or vanes, on the opposite faces thereof. It will be noted that two annular chambers are provided on opposite sides of the rotor within the annular casing, that are connected by means of an annular passage lying radially outwardly beyond the curved periphery 118 of the rotor. The two sets of vanes on the opposite sides of the rotor are, preferably, staggered from each other and extend outwardly from the hub portion 113 at an angle to the radial, so that the inner ends 119 thereof lie to the rear of the outer ends 120 thereof as the rotor rotates in the direction of the arrow indicated in Fig. 6. The vanes, or blades, are indicated by the numeral 121 and are all duplicates, except that the same are what might be termed rights and lefts on opposite sides of the rotor. The blades 121 on one side of the rotor have an edge portion 122 that lies closely adjacent and extends parallel to the wall 95, while those on the other side of the rotor have an edge portion 123 that extends parallel to and is closely adjacent the wall 105. Also the blades on the one side of the rotor have an edge portion 124 that extends closely adjacent and substantially parallel to the wall portion 97, and the blades on the other side of the rotor have an edge portion 125 that extends substantially parallel to and closely adjacent the wall portion 107. Thus each of the blades, or vanes, has edges 122 and 123 that incline toward the central plane of the rotor at a slight angle and edges 124 and 125 that extend at an oblique angle to said first mentioned edges, and at a greater angle to the central plane of the rotor. Each blade has an overhanging portion 126, which extends over and around the curved peripheral edge 118 of the rotor and which has the transverse outer edge 120 thereof sharpened somewhat, as will be clear from Fig. 6, and extending substantially parallel to and in close adjacency to the annular cylindrical wall portion 100 at the periphery of the casing.

As the rotor is rotated within the annular casing provided therefor, the blades, or vanes, on opposite sides thereof create a violent centrifugal whirl at high velocity within the two annular chambers provided on opposite sides of the body portion of the rotor. This causes the material to be thrown outwardly along the inclined walls 95, 105, 97 and 107 toward the annular passage beyond the outer peripheral edge 118 of the rotor, and across the same into the peripheral outer annular portion of the chamber on the opposite side of the rotor from that in which the material has been whirled, the agitator members 126, in the annular passage connecting the chambers, engaging the contents thereof as the same pass transversely across said curved edge 118 to thus further act on the same. As a result the material introduced into the chambers on opposite sides of the rotor is finely divided and substantially vaporized into a mist-like, or nebulous, form and discharged through the opening provided by the cut away portion 111 in the form of a fine mist-like spray. If molasses is introduced into the rotor chamber, as is customary in the use of the machine for producing what is known as molasses feeds, all of the advantages set forth in my Patent No. 2,241,425, above referred to, result, and the molasses is deposited, in a condition in which it has lost most of its viscosity and its stickiness, onto the dry feed material, and is forcibly injected into the dry feed material to impregnate the same, as it will be under full centrifugal force when it leaves the rotor chamber, due to the fact that the rotor, including the transverse blade portions 126, projects through the opening produced in the casing by the cut away portion 111.

Any suitable means for feeding the liquid to the rotor may be provided. In the forms of the invention shown the pump 65 withdraws the molasses from the tank 127 through an inlet connection 128 and elevates the molasses in the pipe 129, from which it passes into a pipe 130 through a molasses supply controlling fitting 131, that contains a valve member 132, whereby molasses can be by-passed through the chamber 133 into the outlet pipe 134, returning excess molasses to the top of the tank 127. The pipe 130 leads to a fitting 135, from which a pipe 136 may extend to a gauge, or other suitable indicating instrument, that may be provided, which is not of importance to the invention and is not shown.

From the fitting 135 a conduit 137 extends downwardly, being provided with branches 138 that are connected with the inlet connections 139 on opposite sides of the casing, said inlet connections lying directly opposite each other and entering the casing, as will be clear from Fig. 4, at a point more than 180° from the opening at 111 in the casing, the annular portion of the casing extending from the tubular portion 85 being indicated generally by the numeral 140 in Fig. 4, and the cap or cover portion being indicated generally by the numeral 141 in Fig. 4. The inlet connections 139 enter the casing near the hub portion 83 of the rotor, but outwardly therefrom, into the chambers provided on opposite sides of the rotor, and the molasses will be engaged by the blades 121 and whipped about in the chambers thus provided in the manner above referred to and as described in the above mentioned patent. By providing the conical wall portions and the straight edges on the casing and on the blades, respectively, much more accurate machining of the parts can be attained and, as it is desirable that a minimum of clearance be provided between the rotor blades and the casing wall, this clearance can be reduced over that obtained by a concave wall and a curved edged blade, by providing the conical walls and the straight edges above referred to.

It will be seen that as the rotor rotates in the direction indicated by the arrow in Fig. 6, which would be in a counterclockwise direction as the mechanism is viewed in Figs. 1 and 2, the molasses, in its finely divided, less viscous than normal condition, is discharged in a spray centrifugally from the opening provided in the under side of the rotor casing in a direction substantially parallel to the axis, or longitudinally of the solid direction of movement of the material carried along in the conveyor housing 14 by the screw conveyor. At the same time the blade-like members 72 on the screw conveyor will agitate the feed ingredients transversely of the direction of the spray while this spraying is taking place, and after the material passes the spraying zone it continues to be agitated by the blades 72 until the upper spiral blade portion 67 of the conveyor is reached, whereupon it is merely carried forward into the outlet passage 15, in which a gate 142 is provided, operated by means of a lever 143 to direct the completed feed product, which is in a sufficiently dried condition that it will not sour or ferment by the time it reaches this point, into either the one or the other of the two discharge outlets 16 or 17.

The conveyor housing may be provided with means for adding minerals or other powdered materials, or any other supplemental feed materials, to the material that is being sprayed upon, said means, preferably, comprising a hopper 150 opening through the top of the housing into the interior thereof to deposit the added material, which may be a powdered material, or grain, or anything of that character, on the conveyor member in the spraying or mixing zone of the same.

While dry feed material, such as dry stalks of corn, or other grains, are preferably, utilized for producing the feed material by means of my apparatus, particularly where the same is to be stored for long periods of time, my apparatus is also capable of use for materials that are not of necessity dry, such as green corn stalks, clover, alfalfa, and other damp or green material.

My apparatus is also adapted to be used for impregnating other absorbent finely divided materials than chopped or cut dry materials, with a liquid. Thus my apparatus is capable of being used for making a sweeping compound by spraying the oil and other liquid ingredients of the sweeping compound onto the sawdust, or other similar material, usually used for this purpose, the sawdust being carried along in the conveying means as the liquid is sprayed thereon in a similar manner to the feed materials above described. The feed materials, whether stalks, leaves, straw, hay, or other coarse feed ingredients, and whether dry or green, can be generally described by the term "fodder" and the term "fodder" is used herein to define such a general class of feed materials, whether dry or green, or in a state between a dry and green state. While the centrifugal vaporizing and spraying and distributing device is described above as having molasses supplied thereto, blends of molasses or other liquids, and blends of liquid and solid materials, such as molasses and a powdered material, for example, a mineral ingredient to be added to the feed, may be fed into said centrifugal spraying and distributing device, and applied to the material on the conveyor in a similar manner to that above described. The blending may be accomplished in a manner described in my Patent No. 2,160,914, patented June 6, 1939.

What I claim is:

1. In a machine of the character described, means for conveying dry feed material in a predetermined path, means for feeding said material to said conveying means, and means for finely dividing and centrifugally spraying a coating liquid onto said dry material while on said conveying means, said spraying means unrestrictedly discharging said liquid in finely divided form at high velocity onto said material longitudinally of said path, said conveying means comprising means for agitating said material while having said liquid sprayed thereon and while being advanced along said path.

2. In a machine of the character described, means for conveying dry feed material in a predetermined path, comprising a housing and a screw conveyor therein, means for feeding said material to said conveying means, and means for finely dividing and spraying a coating liquid onto said dry material while on said conveying means, comprising an annular casing extending into said housing, means for centrifugally whirling said liquid in said casing, said casing having a wide discharge slot at its periphery within said housing extending lengthwise of said conveying means, said means projecting through said slot, said screw conveyor comprising means for agitating said material transversely of said path of movement in the zone within said housing over which said liquid is sprayed thereon and while being advanced along said path.

3. In a machine of the character described, means for conveying dry feed material in a predetermined path, means for feeding said material to said conveying means, and means for finely dividing and centrifugally spraying a coating liquid onto said dry material while on said conveying means, said means unrestrictedly centrifugally discharging liquid over a defined zone of said conveying means in finely divided form, said conveying means comprising a housing, a screw conveyor in said housing and means for rotating said screw conveyor to advance material engaged thereby longitudinally of said housing, said conveyor comprising a plurality of spirally arranged combined agitating and conveying members in said zone over which said liquid is discharged.

4. In a machine of the character described, rotary means for centrifugally whipping and spraying molasses by unrestricted discharge from the periphery of said rotary means, screw means for conveying dry feed material into the spray discharged by said rotary means, said screw means rotating about an axis perpendicular to the axis of said rotary means and comprising means for agitating said dry material as said molasses is being sprayed thereon, means for discharging the dry feed material onto said conveying means, and means for driving said conveying means and spraying means at predetermined relative speeds.

5. In a machine of the character described, means for conveying feed material in a predetermined path, and means for finely dividing and centrifugally distributing a viscous liquid onto said feed material in finely divided condition at high velocity while on said conveying means comprising a housing having rotatable impelling means therein creating a centrifugal whirl of said liquid from which said liquid is unrestrictedly discharged onto said conveying means, said conveying means comprising means for agitating said feed material transversely of said path while said liquid is being centrifugally distributed onto the same in a direction generally lengthwise of said path.

6. In a machine of the character described, a fodder cutter, positively driven means for feeding fodder to said cutter, rotary liquid spraying means, means extending through the spray discharged by said spraying means for conveying cut fodder at a controlled rate into said spray while on said conveying means, means for discharging cut fodder directly from said cutter onto said conveying means, and means for driving said cutter, conveying means and spraying means at predetermined relative speeds.

7. In a machine of the class described, a housing, conveying means therein, a centrifugal distributor discharging into said housing onto said conveying means, means for feeding cut feed onto said conveying means, means for controlling the amount of material fed by said feeding means, means for supplying a blend of mobile materials to said distributor, means for controlling the amount of said blend supplied to said distributor, said distributor spraying the material therefrom in the form of a mist by centrifugal force onto the material on said conveying means, and means for synchronizing the operation of said feeding means, said conveyor and said centrifugal distributing means.

8. In a machine of the character described, means for conveying cut solid feed material in a predetermined path, means for feeding said material to said conveying means, means for finely dividing and spraying a liquid onto said cut solid material while on said conveying means, said conveying means comprising means for agitating said material while having said liquid sprayed thereon and while being advanced along said path, and means for adding a solid finely divided ingredient to the feed material while being agitated by said conveying means within the zone in which said liquid is sprayed thereon while said feed material is being sprayed with said liquid.

9. In a machine of the class described, a housing, conveying means therein for moving material lengthwise of said housing, a centrifugal distributor discharging into said housing onto said conveying means, means for feeding material onto said conveying means, means for controlling the amount of material fed by said feeding means, means for supplying a blend of mobile materials to said distributor, and means for controlling the amount of said blend supplied to said distributor, said distributor spraying the blended material therefrom unrestrictedly in the form of a mist by centrifugal force about an axis transverse to the length of said housing onto the material on said conveying means, said conveying means agitating said material transversely of the length of said housing while in said spray.

10. In a machine of the character described, means for conveying feed material in a predetermined path, and means for finely dividing and centrifugally unrestrictedly distributing a mobile material by rotation about an axis transverse to said path onto said feed material while on said conveying means, said conveying means comprising means for agitating said feed material transversely to the direction of discharge of said mobile material and transversely of said path while said mobile material is being centrifugally distributed onto the same.

11. In a machine of the character described, an inclined tubular housing, a conveyor extending longitudinally of said housing operating to convey material from the lower to the upper end thereof, means for feeding material into said housing onto the lower end of said conveyor by gravity, means extending into said housing adjacent the lower end thereof for centrifugally discharging a mobile material into said housing onto the material on said conveyor over a zone extending lengthwise of said housing from adjacent said lower end thereof to a point spaced from the upper end thereof, and means depending from the upper end of said housing beyond said zone for receiving material from said conveyor and discharging the same into a container.

12. In a machine of the character described, an inclined tubular housing, a screw conveyor extending longitudinally of said housing operating to convey material from the lower to the upper end thereof, means for feeding material into said housing onto the lower end of said conveyor by gravity, means extending into said housing adjacent the lower end thereof for centrifugally discharging a mobile material into said housing onto the material on said conveyor over a zone extending lengthwise of said housing from adjacent said lower end thereof to a point spaced from the upper end thereof, comprising a casing and a rotor in said casing rotating about an axis perpendicular to the axis of said conveyor, said casing extending into said housing and being cut away to provide a slot through which the periphery of said rotor projects into said housing, and means depending from the upper end of said housing beyond said zone for receiving material from said conveyor and discharging the same into a container.

13. In a machine of the character described, an inclined tubular housing, a screw conveyor extending longitudinally of said housing operating to convey material from the lower to the upper end thereof, means for feeding material into said housing onto the lower end of said conveyor by gravity, means extending into said housing adjacent the lower end thereof for centrifugally discharging a mobile material into said housing onto the material on said conveyor over a zone extending lengthwise of said housing from adjacent said lower end thereof to a point spaced from the upper end thereof, comprising a casing, and a rotor in said casing rotating about an axis perpendicular to the axis of said conveyor, said casing extending into said housing and being cut away to provide a slot through which the periphery of said rotor projects into said housing, said housing having an enlarged portion providing a mixing chamber above said conveyor over said zone and agitating means on said conveyor in said zone operating transversely of the length thereof.

14. In a machine of the character described, an inclined tubular housing, a screw conveyor extending longitudinally of said housing operating to convey material from the lower to the upper end thereof, means for feeding material into said housing onto the lower end of said conveyor by gravity, means extending into said housing adjacent the lower end thereof for centrifugally discharging a mobile material into said housing onto the material on said conveyor over a zone extending lengthwise of said housing from adjacent said lower end thereof to a point spaced from the upper end thereof, comprising a casing, and a rotor in said casing rotating about an axis perpendicular to the axis of said conveyor, said casing extending into said housing and being cut away to provide a slot through which the periphery of said rotor projects into said housing, said housing having an enlarged portion providing a mixing chamber above said conveyor over said zone, agitating means on said conveyor in said zone operating transversely of the length thereof, and a hopper on the upper side of said housing at said enlarged portion nearer the upper end thereof than said casing having a discharge outlet leading into said housing within said zone.

15. In a machine of the character described, a feed cutter, means for conveying feed to said cutter, an inclined tubular housing, a conveyor extending longitudinally of said housing operating to convey material from the lower to the upper end thereof, means for feeding material into said housing onto the lower end of said conveyor from said cutter by gravity, comprising a chute extending from said cutter to the lower end of said housing, adjustable means controlling the rate of feed of said cut feed through said chute, means extending into said housing adjacent the lower end thereof for centrifugally unrestrictedly discharging a mobile material into said housing onto the material on said conveyor over a zone extending lengthwise of said housing from adjacent said lower end thereof to a point spaced from the upper end thereof, and means depending from the upper end of said housing beyond said zone for receiving material from said conveyor and discharging the same into a container.

16. In a machine of the character described, means for conveying a material to be coated in a restricted predetermined path, means for finely dividing and centrifugally distributing a mobile coating material by rotation about an axis transverse to said path and unrestricted discharge from the whirl created by such rotation under centrifugal force onto said material to be coated while on said conveying means, said conveying means comprising means for agitating said material to be coated transversely to the direction of discharge of said mobile coating material and while said mobile material is being centrifugally distributed onto the same.

HERMANN HENRY SCHMIDT.